(12) United States Patent
Inglis et al.

(10) Patent No.: US 8,782,623 B2
(45) Date of Patent: Jul. 15, 2014

(54) PROFILER FOR EXECUTING COMPUTER PROGRAM

(75) Inventors: Derek B. Inglis, Ontario (CA);
Kiyokuni Kawachiya, Kanagawa (JP);
Tamiya Onodera, Kanagawa (JP);
Michiaki Tatsubori, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 13/273,644

(22) Filed: Oct. 14, 2011

(65) Prior Publication Data

US 2012/0096447 A1    Apr. 19, 2012

(30) Foreign Application Priority Data

Oct. 15, 2010 (JP) ................................ 2010-233085

(51) Int. Cl.
*G06F 9/45* (2006.01)

(52) U.S. Cl.
USPC .......................................................... 717/148

(58) Field of Classification Search
USPC .......................................................... 717/148
See application file for complete search history.

(56) References Cited

U.S. PATENT DOCUMENTS

| 5,655,122 | A * | 8/1997 | Wu | 717/152 |
| 6,072,951 | A * | 6/2000 | Donovan et al. | 717/158 |
| 6,760,907 | B2 * | 7/2004 | Shaylor | 717/158 |
| 2005/0138611 | A1 * | 6/2005 | Inglis et al. | 717/151 |
| 2007/0074171 | A1 * | 3/2007 | Burka et al. | 717/127 |
| 2009/0089550 | A1 * | 4/2009 | Cabillic et al. | 712/208 |
| 2010/0031241 | A1 * | 2/2010 | Schwartz | 717/149 |
| 2010/0299658 | A1 * | 11/2010 | Ng et al. | 717/140 |

FOREIGN PATENT DOCUMENTS

| JP | 09-62544 | 3/1997 | G06F 11/34 |
| JP | 11-212837 | 8/1999 | G06F 11/34 |
| JP | 2002-132542 | 5/2002 | G06F 11/28 |
| JP | 2003009253 (A) | 1/2003 | |
| JP | 2003032752 (A) | 1/2003 | |
| JP | 2003124942 (A) | 4/2003 | |
| JP | 2005346407 (A) | 12/2005 | |
| JP | 2009194540 (A) | 8/2009 | |

OTHER PUBLICATIONS

Gal, Andreas et al.; "Trace-based Just-in-Time Type Specialization for Dynamic Languages"; PLDI'09; Jun. 15-20, 2009.*

(Continued)

*Primary Examiner* — Qing Chen
*Assistant Examiner* — Clint Thatcher
(74) *Attorney, Agent, or Firm* — Ido Tuchman; Gail H. Zarick

(57) ABSTRACT

A technique for comprehensively acquiring calling-context information at a low cost. Call site IDs are held for each thread as a call history and used as context information. At the time of calling a method, the call history existing in a current frame is shifted left, and stacked in a new frame, with the call site ID of the call site put in the lower bits. At the time of returning from the method, the value of the original call history is returned by returning the frame. At the time of performing a virtual call, call history information is recorded into a call position profile table used to identify a method to be inlined at the time of performing JIT compiling, in addition to determined jump destination information and the number of calls.

18 Claims, 6 Drawing Sheets

(56) References Cited

OTHER PUBLICATIONS

Sedlacek, Jiri; "Profiling With VisualVM, Part 2"; Oracle.com website; Jul. 31, Jul. 2008.*

Kim Hazelwood and David Grove, "Adaptive Online Context-Sensitive Inlining", International Symposium on Code Generation and Optimization, Mar. 23-26, 2003.

Matthew Arnold, Stephen Fink, Vivek Sarkar, Peter F. Sweeney, "A comparative study of static and profile-based heuristics for inlining", ACM SIGPLAN Notices, vol. 35, Issue 7 (Jul. 2000), pp. 52-64.

Xiaotong Zhuang, Mauricio J. Serrano, Harold W. Cain, Jong-Deok Choi, "Accurate, efficient, and adaptive calling context profiling", Proceedings of the 2006 ACM SIGPLAN Conference on Programming Language Design and Implementation.

"HPROF: A Heap/CPU Profiling Tool in J2SE 5.0", http://java.sun.com/developer/technicalArticles/Programming/HPROF.html.

Michael D. Bond, Kathryn S. McKinley, "Probabilistic calling context", Proceedings of the 22nd annual ACM SIGPLAN Conference on Object Oriented Programming Systems Languages and Applications, pp. 97-112, 2007.

* cited by examiner

PROFILER FOR EXECUTING COMPUTER PROGRAM

CROSS-REFERENCE TO RELATED APPLICATIONS

This application claims priority under 35 U.S.C. §119 to Japanese Patent Application No. 2010-233085 filed Oct. 15, 2010, the entire text of which is specifically incorporated by reference herein.

BACKGROUND

The present invention relates to a technique for calling and executing a program on a computer, and more particularly, to profiling.

For a programming language processor or execution system used in a server environment, there have been conventionally used dynamic script languages such as PHP and more static programming languages such as Java®. Recently, in order to easily call class assets of Java® from PHP or the like, it becomes popular to implement dynamic script languages on a static programming language such as Java®.

Especially, P8 and Quercus as PHP, JRuby as Ruby, Jython as Python, Groovy and the like, which are running on a Java® virtual machine, are known.

The speed of such a dynamic script language processor on Java®, however, is often slower than native implementation. One of the reasons for the reduced speed is that method inlining of Java's JIT compiler cannot be used because of the dynamic type of the system.

FIG. 1 shows an example of a typical handler invocation path in a dynamic script language processor on Java®. In FIG. 1, a virtual call x.add exists on the way of being called from FuncA. To which real method (processing handler) this will jump depends significantly on a called context. That is, x.add is a truly polymorphic call.

In order to inline an appropriate processing handler (in this example, DInt.add) at the time of JIT-compiling of FuncA, profiling information which includes calling-context information is required such as "When a call is made in the order of FuncA->Handler.add->Operator.add, the virtual call x.add jumps to DInt.add."

Accordingly, it has been conventionally common to perform profiling, and inline a code determined to be appropriate on the basis of the information.

FIG. 2 shows an example in which DInt.add is appropriately inlined into FuncA with the use of obtained profiling information.

The followings are conventional techniques for acquiring profiling information.

Japanese Patent Laid-Open No. H09-62544 discloses a profiling method in which, in order to grasp the behavior of a program for a parallel computer described in an original source code in a sequential form, an instrumentation code is inserted into a converted code of the program optimization-converted by a compiling process, the instrumentation code instructing measurement of profile data at the time of executing the program, the method being configured so that a profile initialization process for collecting the original source code information of the program is performed before the optimization conversion by the compiling process.

Japanese Patent Laid-Open No. H11-212837 discloses a configuration including: a static analysis/profile processing inserting section detecting function calls in a source program, storing them into a database by attaching an identification number for each type of call pair, inserting profile processing into the source program for each function call, and setting an area for a table storing the number of function calls for each identification number, in order to reduce a memory area and overhead at the time of performing the profile processing; a compiling/program executing section compiling and executing the profile processing included source program and, when the profile processing is performed, incrementing the number of function calls in the table with an identification number corresponding to the type of call pair as an index; and a profile information integrating section generating information about the number of calls for each type of call pair by reading the number of function calls in the table for each identification number.

Japanese Patent Laid-Open No. 2002-132542 discloses that: in order to reduce the size of a table required for collecting call pair information related to dynamic function calls in a program, dynamic caller functions and dynamic callee functions are picked up, each of which is given a function ID; a profile processing inserting section generates a profile processing included source program which includes processing for securing an area for a dynamic call pair information storage table storing, for each dynamic call pair which is a pair of the function ID of a dynamic caller function and the function ID of a dynamic callee function, the number of calls of the dynamic call pair, and dynamic call profile processing; and a compiling/program executing section compiles and executes the source program and collects the number of calls for each of call pairs related to dynamic calls using the table.

However, the profiling processes of these conventional techniques are not suitable to be applied to a processing handler of a dynamic script language processor in terms of the cost for profiling and comprehensibility.

Accordingly, a simple method is conceivable in which stack traversing is performed as necessary at the time of profiling. However, the cost of this method is high.

A method of temporarily embedding a code for profile at the time of upgrading/compiling can be applied only to a part of methods which are executed very frequently.

In "Adaptive Online Context-Sensitive Inlining" by Kim Hazelwood and David Grove, Code Generation and Optimization, 2003, International Symposium on Code Generation and Optimization, 23-26 Mar. 2003, a profiling process by sampling is disclosed. In this method, however, collected information is not comprehensive. Furthermore, especially processing handlers of a dynamic script language processor are leaf methods with a small size, and therefore, sampling cannot be performed well. Furthermore, since stack traversing, which is heavy processing, is required, the sampling rate cannot be high.

In "A comparative study of static and profile-based heuristics for inlining" by Matthew Arnold, Stephen Fink, Vivek Sarkar and Peter F. Sweeney, ACM SIGPLAN Notices, Volume 35, Issue 7 (July 2000), Pages 52-64, a profiling process using a call graph is disclosed. However, in the case where calls join and separate as shown in FIG. 1, it is not possible to correctly determine an inlining destination.

In "Accurate, efficient, and adaptive calling context profiling" by Xiaotong Zhuang, Mauricio J. Serrano, Harold W. Cain and Jong-Deok Choi, Conference on Programming Language Design and Implementation Proceedings of the 2006 ACM SIGPLAN, a technique is disclosed which enables correct determination by creating a calling context tree. In this case, an additional process for creating the tree and a memory for holding the tree are required.

In "HPROF: A Heap/CPU Profiling Tool in J2SE 5.0", http://java.sun.com/developer/technicalArticles/Programming/HPROF.html, HPROF which is a profiler using JVMTI is described. Though this profiler is capable of acquiring comprehensive information, the speed is slow. Furthermore, a memory for holding a log and post-processing for aggregation of context information are required.

According to the technique disclosed in "Probabilistic calling context" by Michael D. Bond and Kathryn S. McKinley, Proceedings of the 22nd annual ACM SIGPLAN Conference on Object Oriented Programming Systems Languages and Applications, Pages 97-112, 2007, the memory for holding data can be minimized, but it is difficult to know online which path is used. Therefore, the technique cannot be used for inlining.

Patent Document 1

Japanese Patent Laid-Open No. H09-62544

Patent Document 2

Japanese Patent Laid-Open No. H11-212837

Patent Document 3

Japanese Patent Laid-Open No. 2002-132542

Non Patent Document 1

Kim Hazelwood and David Grove, "Adaptive Online Context-Sensitive Inlining", International Symposium on Code Generation and Optimization, 23-26 Mar. 2003

Non Patent Document 2

Matthew Arnold, Stephen Fink, Vivek Sarkar, Peter F. Sweeney, "A comparative study of static and profile-based heuristics for inlining", ACM SIGPLAN Notices, Volume 35, Issue 7 (July 2000), Pages 52-64

Non Patent Document 3

Xiaotong Zhuang, Mauricio J. Serrano, Harold W. Cain, Jong-Deok Choi, "Accurate, efficient, and adaptive calling context profiling", Proceedings of the 2006 ACM SIGPLAN Conference on Programming Language Design and Implementation Non Patent Document 4

"HPROF: A Heap/CPU Profiling Tool in J2SE 5.0", http://java.sun.com/developer/technicalArticles/Programming/HPROF.html Non Patent Document 5

Michael D. Bond, Kathryn S. McKinley, "Probabilistic calling context", Proceedings of the 22nd annual ACM SIGPLAN Conference on Object Oriented Programming Systems Languages and Applications, Pages 97-112, 2007.

BRIEF SUMMARY

Thus, it is an object of one embodiment of the present invention to provide a technique for comprehensively acquiring calling context information suitable for profiling of a dynamic script language processor at a low cost.

In accordance with an embodiment of the present invention, an ID (other than 0; the ID may be duplicated) with a predetermined number of bits (preferably 8 bits) is assigned to each call site, and call site IDs corresponding to the latest predetermined number of levels (preferably corresponding to four levels) are held for each thread preferably as 32-bit data (called a call history in the present invention) and are used as context information.

Preferably, a 32-bit area is added to a stack frame created at the time of calling a method, as a place for holding the call history.

At the time of calling a method, a call history existing in a current frame is shifted left by 8 bits, and stacked in a new frame, with the call site ID of the call site put in the lower 8 bits.

At the time of returning from the method, the original frame is restored, and therefore, the original value of the call history automatically returns.

As a further improvement, a call history is held not in a stack frame but in a fixed place for each thread, and thereby, stack frame consumption can be suppressed. As the holding place, for example, one field in a JVM thread structure is conceivable. Otherwise, a dedicated register may be prepared.

At the time of calling a method, the call history field is shifted left by 8 bits, and the call site ID of the call site is put into the lower 8 bits.

At the time of returning from the method, the call history field is shifted right by 8 bits. Then, the call site information at the most significant part is missing. This will be coped with in the following method.

That is, the value of the call history is left with a part thereof missing. It does not matter because the next method call is performed at once in most cases.

If the information of the missing part is required to use the call history, it can be replenished by performing stack traversing.

Furthermore, according to one embodiment of the present invention, the call history is also recorded in a profile table for recording jump destinations of virtual calls, in addition to real jump destinations and the number of times. Then, it is possible to inline a suitable jump destination dependent on context on the basis of the information at the time of JIT compiling. In this case, it does not matter if a call site ID is duplicated, because it is only necessary to exclude jump destination information unrelated to the context in the JIT.

According to one aspect of the present invention, it is possible to reduce the size of a table by recording only call source information required for determination of a jump destination. Only when there are actually multiple jump destinations, call source context information corresponding to the number of levels required for separation of the jump destinations is recorded.

According to this embodiment, an advantage can be obtained that the cost of a profiling process can be reduced without impairing the comprehensiveness. Furthermore, by recording the call history in a profile table for recording jump destinations of virtual calls, in addition to real jump destinations and the number of times, context-dependent inlining becomes possible.

BRIEF DESCRIPTION OF THE DRAWINGS

The figures form a part of the specification and are used to describe the embodiments of the invention and explain the principle of the invention together with the literal statement.

DETAILED DESCRIPTION

Figure 1:
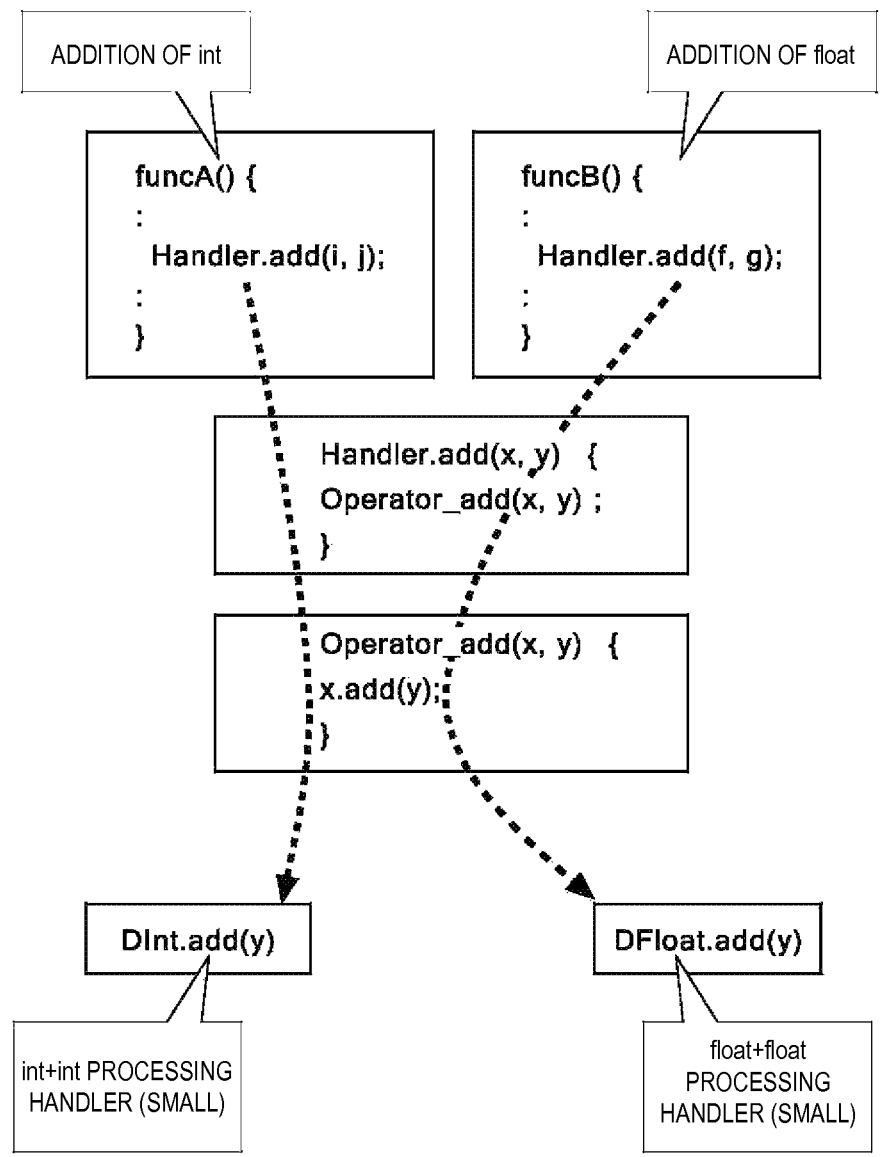
FIG. 1 is a diagram illustrating a call of a virtual method.
Figure 2:
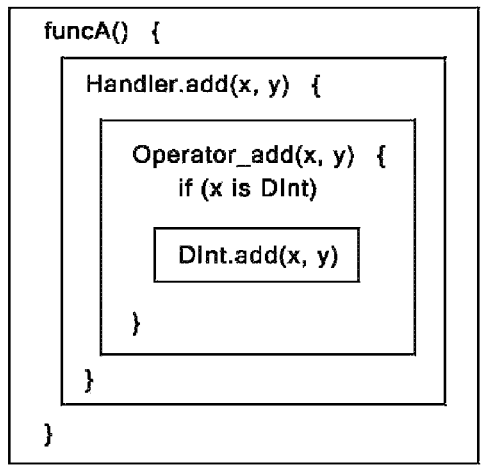
FIG. 2 is a diagram illustrating an inlining process.

An embodiment of the present invention will be described below in accordance with drawings. It should be understood that the embodiment is intended to describe preferable aspects of the present invention and are not intended to limit the scope of the invention to what is shown here. Through the figures shown below, it is assumed that the same reference numerals denote the same subjects unless otherwise specified.

Figure 3:
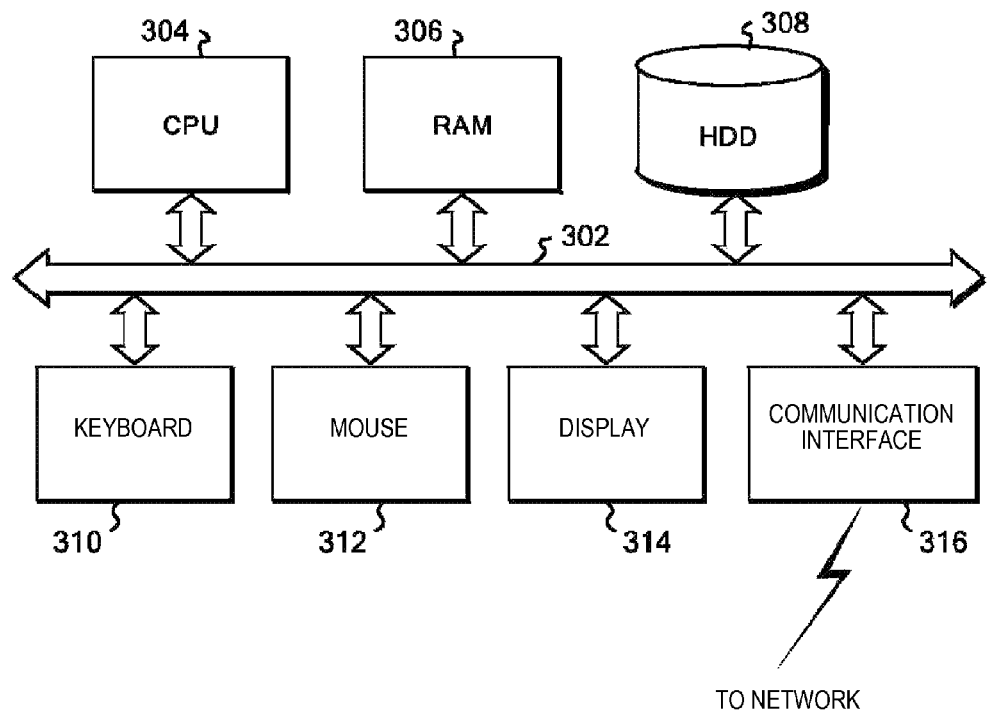
FIG. 3 is a block diagram of an example of hardware for practicing the present invention.

Referring to FIG. 3, there is shown a block diagram of computer hardware for realizing a system configuration and a process according to an embodiment of the present invention. In FIG. 3, a CPU 304, a main memory (RAM) 306, a hard disk drive (HDD) 308, a keyboard 310, a mouse 312 and a display 314 are connected to a system bus 302. The CPU 304 is preferably based on a 32-bit or 64-bit architecture, and, for example, Pentium® 4 by Intel Corporation, Core® 2 DUO and Xeon® by Intel Corporation, Athlon® by Advanced Micro Devices, Inc. and the like can be used. The main memory 306 has preferably a capacity of 2 GB or more, and more favorably 4 GB or more.

In the hard disk drive 308, an operating system is stored. The operating system may be any system compatible with the CPU 304, such as Linux®, Windows® 7, Windows XP® and Windows® 2003 Server by Microsoft Corporation, and Mac OS® by Apple Computer, Inc.

In the hard disk drive 308, there is also stored a program for causing the system to operate as a Web server, preferably such as Apache, and it is loaded onto the main memory 306 when the system is activated.

In the hard disk drive 308, the Java® Runtime Environment program for realizing a Java® virtual machine (VM) is further stored, and it is loaded onto the main memory 306 when the system is activated.

In the hard disk drive 308, there are further stored a Java® bytecode generator 406 for a dynamic script language and a source code 410 which is written in the dynamic script language. The dynamic script language in this embodiment may be any of P8 and Quercus as PHP running on a Java® virtual machine, JRuby as Ruby, Jython as Python, Groovy, and the like. Especially in this example, it is assumed that the Java® bytecode generator is that for PHP, which is typically P8.

In the hard disk drive 308, there is further stored a JIT compiler 408 provided with the inlining function of the present invention. The bytecode generator 406 and the JIT compiler 408 will be described later in relation to FIG. 4.

The keyboard 310 and the mouse 312 are used to operate graphic objects such as an icon, a task bar and a window displayed on the display 314, in accordance with a graphic user interface provided by the operating system.

The display 314 is preferably a 32-bit true color LCD monitor with a resolution of 1024 768 or more though not limited thereto.

A communication interface 316 is preferably connected to a network via the Ethernet® protocol. The communication interface 316 receives a processing request from a client computer (not shown) in accordance with a communication protocol such as TCP/IP by a function provided by Apache or returns a processing result to the client computer (not shown).

Figure 4:
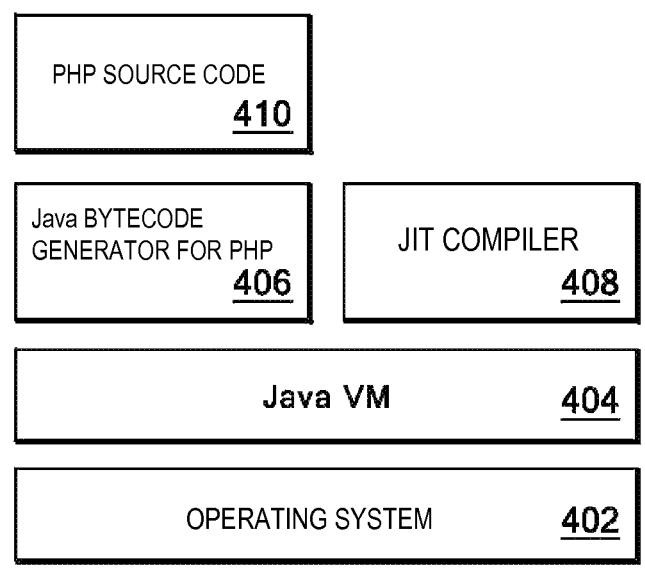
FIG. 4 is a diagram showing the layers of functional blocks.

In FIG. 4, the lowest layer is an operating system 402, and it is Windows® 2003 Server or Linux® in this embodiment though not limited thereto.

On the operating system 402, a Java® VM (also referred to as a JVM) 404 of a version compatible with the operating system 402 operates.

On the layer of the Java® VM 404, the Java® bytecode generator 406 for PHP and the JIT compiler 408 according to the present invention operate.

The PHP source code 410 is stored in the hard disk drive 308, and it is a file which includes a statement described in the form of <?php~?> and has an extension php, as is well known. In response to a request received from a client computer (not shown) via the network, the Java® bytecode generator 406 for PHP interprets and executes a specified PHP source code 412 to generate a bytecode.

By appropriately performing method inlining of the bytecode generated by the Java® bytecode generator 406 for PHP, by a process to be described later, the JIT compiler 408 converts the bytecode to an executable code native to the CPU 304.

The function of the JIT compiler 408 is to once perform optimization by a function in accordance with the present invention using method inlining and then perform conversion to an execution code native to the CPU 304 and the operating system 402.

Figure 5:
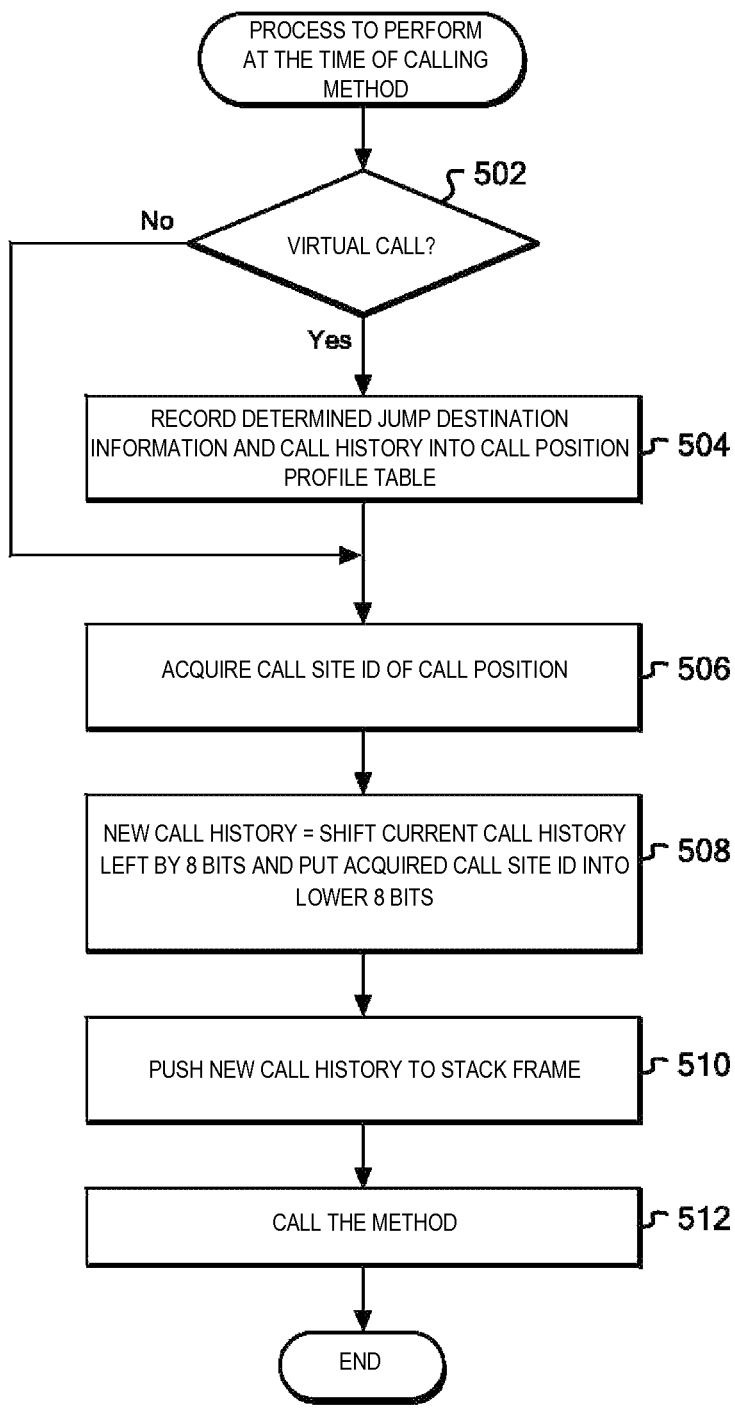
FIG. 5 is a diagram showing the flowchart of a method calling process.

Next, a process for creating a profile table by the function of the JIT compiler 408 will be described with reference to the flowchart of FIG. 5.

When performing this process, the JIT compiler 408 inserts, for example, an instrumentation code as shown below into the call position of a bytecode generated by the bytecode generator 406 in advance.

```
void m(int call_history, int a, int b) {
    int c=...;
    int d=...;
    n((call_history<<8)|CALLSITE_ID_1, c, d); /*
    calculate a new call history (call_history) and hands
    it over as a first argument */
        :
}
void n(int call_history, int c, int d) {...}
```

By executing the bytecode in which such a code is embedded under the Java® VM for a predetermined period of time, a profile table is recorded. The process shown in the flowchart of FIG. 5 relates mainly to such a profile table recording process.

At step 502, when a call is made, the JIT compiler 408 determines whether the call is a virtual call, that is, a call of a virtual method.

If so, the JIT compiler 408 records determined jump destination information, a call history and the number of calls in a call position (call site) profile table by the inserted code described above, at step 504. If not, step 504 is skipped.

As for a jump destination position profile table, the amount of recording into the table is preferably saved by recording only call source information required for determination of the jump destination. That is, only when there are actually multiple jump destinations, call source context information corresponding to the number of levels required for separation of the jump destinations is recorded.

More preferably, only such methods that the size is larger than a certain threshold are targeted by context information collection and recorded in the profile table. This is because a small method is inlined into a different method in the end and does not have to be targeted by information collection. Furthermore, information about a small-sized method may be locally degenerated in a method similar to that described in "Probabilistic calling context" by Michael D. Bond and Kathryn S. McKinley, Proceedings of the 22nd annual ACM SIGPLAN Conference on Object Oriented Programming Systems Languages and Applications, Pages 97-112, 2007, which has been described before.

At step 506, the JIT compiler 408 acquires the call site ID of the call position. The call site ID may be a random number other than 0, or suitable 8 bits from the address of the call site may be used. Some value duplication among call sites may be allowed. However, the condition is necessary that a call ID should be uniquely determined from a call site, that is, the same ID value should be obtained for the same call site no matter how many times the ID is calculated. It is desirable that values do not gather within a narrow range but are moderately scattered.

At step 508, the JIT compiler 408 calculates a new call history by shifting the current call history left by 8 bits and putting the acquired call site ID into the lower 8 bits.

At step 510, the JIT compiler 408 pushes the new call history to a stack frame.

At step 512, a method call is performed by ordinary processing.

In the description here, it has been assumed that the JIT compiler 408 and a code embedded by the JIT compiler 408 perform profiling. Actually, however, it is also possible for a bytecode interpreter in the Java® VM 404 performs the process.

Figure 6:
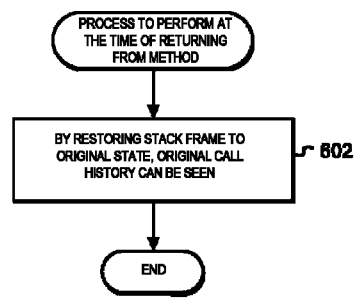
FIG. 6 is a diagram showing the flowchart of a process for returning from a method.

FIG. 6 shows a process at the time of returning from a method. That is, as shown in step 602, at the time of having returned from a method, a stack frame is restored to the original state, and the original call history can be seen.

Figure 7:
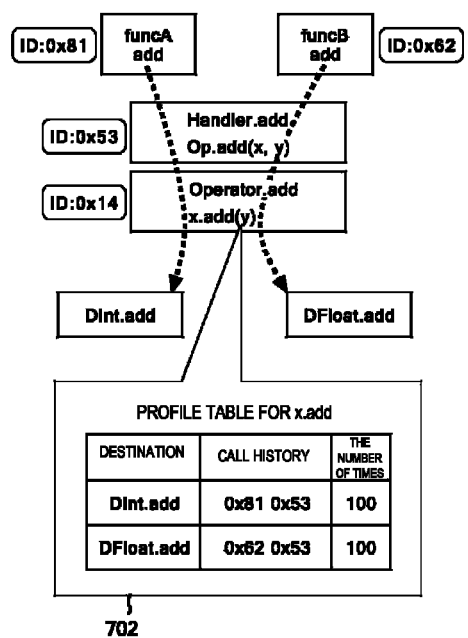
FIG. 7 is a diagram showing giving of an ID, recording of a call history, and a corresponding profile table.

FIG. 7 typically shows a state in which a call site ID is given to a call site in relation to calling of x.add, and an accompanying process in which a jump destination for x.add, a call history and the number of times are recorded in a profile table 702. In this embodiment, though the call history is 32 bits, only the amount required for determination of a jump destination, that is, only 2 bytes in this case are recorded as shown in FIG. 7. The recording size of the profile table can be saved by such a process. The profile table 702 is recorded in a suitable area in the main memory 306, for example, a heap area for each call site.

Figure 8:
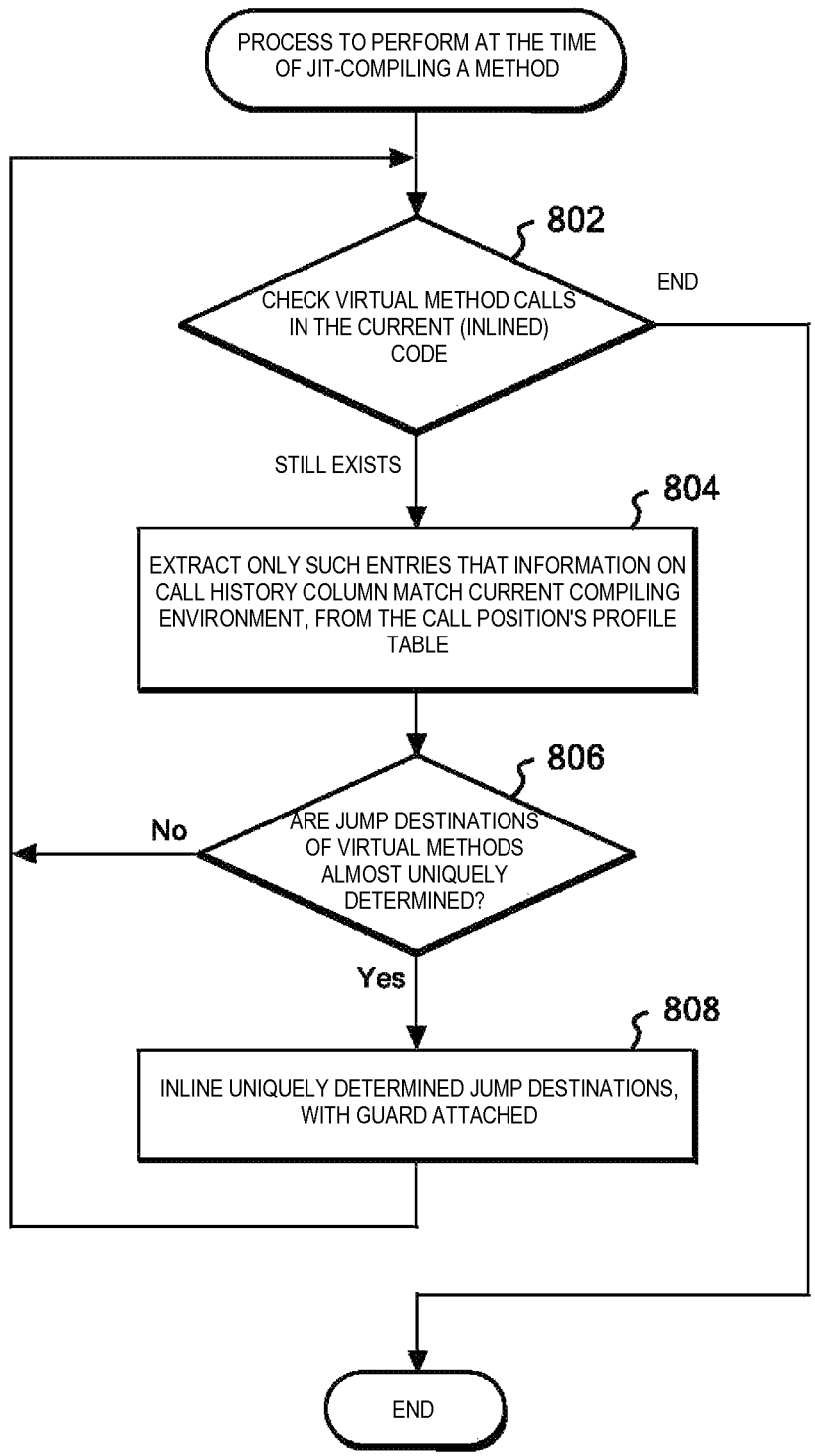
FIG. 8 is a diagram showing the flowchart of an addition process at the time of JIT-compiling of a method.

FIG. 8 is a diagram showing the flowchart of an addition process at the time of the JIT compiler 408 compiling a method.

At step 802, the JIT compiler 408 checks virtual methods in the current code, which may contain the result of inlining. If all the virtual method calls have been checked, the process ends. Otherwise, the process proceeds to step 804, where only such entries that call history information matches the current compiling information, that is, the arrangement of call site IDs in calling order are extracted from a call position's profile table. The matching here is sufficient if the number of bytes of the call history recorded in the profile table is matched.

As a result of the matching, jump destinations of the virtual methods are uniquely determined at step 806, that is, there is only one entry with which the call history matches. Otherwise, even if there are multiple matching entries, such an entry that the number of times of being recorded in the profile table is large can be selected on the basis of imbalance of the number of times of being recorded in the profile table.

If it is determined at step 806 that the jump destinations of the virtual methods are not determined, the process returns to step 802.

If the jump destinations of the virtual methods are almost uniquely determined at step 806, then the JIT compiler 408 inlines the determined jump destinations with guards attached, at step 808. The "guard-attached inlining" means to perform inlining, attaching a guard code for checking whether a condition is satisfied at the time of execution. For example, even if it is known that "almost 99% is of the DInt type" from a profile, it is not certain. Therefore, a guard for checking whether it is true is attached. This is processing commonly performed in conventional techniques and in inlining. An example of such a code is shown below.

```
funcA( ) {
    x=...;
    y=...;
    /* a code in which the process below Handler_add(x, y) is inlined */
    if (x instanceof DInt) /* guard */
        z=x.intValue+y.intValue; /* an inlined code in the
case of Dint */
    else
        z=x.add(y); /* perform a virtual call */
    :
}
```

A profiling process according to one embodiment of the present invention has been described, with a process for performing inlining by a JIT compiler running on a Java® VM as an example. However, the present invention is not limited thereto and applicable to general profiling instrumentation.

In the above embodiment, it is assumed that the call history is 32 bits, and each of the call site IDs constituting the levels of the call history is 8 bits. However, the number of bits and the number of levels are not limited thereto, and any number of bits and any number of levels may be adopted depending on the architecture of the CPU and the like.

Furthermore, in the above embodiment, the call history is recorded in a stack frame. However, the call history may be stored in one field of a thread structure or in a dedicated register.

The disclosed methods of the present invention may be implemented by software, hardware or a combination thereof. The hardware part can be implemented by using a special logic, and the software part can be stored in a memory and executed by an appropriate instruction execution system, such as a microprocessor, a personal computer (PC) or a mainframe.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadcast interpretation so as to encompass all such modifications and equivalent structures and functions.

That which is claimed is:

1. A computer implemented profiling method for profiling information outputted by an instrumentation code embedded in an execution code, the method comprising the steps of: allocating a call site ID with a predetermined number of bits to a call site; holding the latest N levels as call history information for each thread, where N is an integer larger than 1; recording a real jump destination, the number of times and the call history information into a virtual call jump destination profile table; and shifting the call history information left and putting another call site ID associated with another method in the lower bits of the call history information upon a call to the another method from the call site.

2. The method according to claim 1, wherein, as for recording of the call history information, only call source information required for determination of a jump destination is recorded in units of the predetermined number of bits.

3. The method according to claim 1, wherein the call history information is recorded in a stack frame.

4. The method according to claim 2, wherein the predetermined number of bits is 8, and the N is 4.

5. The method according to claim 1, wherein duplication of the call site ID between different call sites is allowed.

6. The method according to claim 1, wherein the recording into the profile table is performed only for a method the size of which is larger than a predetermined value.

7. A just-in-time (JIT) compiler system including a microprocessor extracting only such an entry that the call history information in the profile table created in the method according to claim 1 matches a current compiling environment and performing inlining.

8. A computer program product comprising a non-transitory computer usable medium and an executable profiling program embodied in the non-transitory computer usable medium for profiling information outputted by an instrumentation code embedded in an execution code, the program causing the computer to execute the steps of: allocating a call site ID with a predetermined number of bits to a call site; holding the latest N levels as call history information for each thread, where N is an integer larger than 1; recording a real jump destination, the number of times and the call history information into a virtual call jump destination profile table; and shifting the call history information left and putting another call site ID associated with another method in the lower bits of the call history information upon a call to the another method from the call site.

9. The program product according to claim 8, wherein, as for recording of the call history information, only call source information required for determination of a jump destination is recorded in units of the predetermined number of bits.

10. The program product according to claim 8, wherein the call history information is recorded in a stack frame.

11. The program product according to claim 9, wherein the predetermined number of bits is 8, and the N is 4.

12. The program product according to claim 8, wherein duplication of the call site ID between different call sites is allowed.

13. The program product according to claim 8, wherein the recording into the profile table is performed only for a method the size of which is larger than a predetermined value.

14. A just in time (JIT) compiler system including a microprocessor and the program product according to claim 8 and including a step of extracting only such an entry that the call history information in the profile table created by the program matches a current compiling environment and performing inlining.

15. A just in time (JIT) compiler system according to claim 14, wherein the call history information is passed to the another method as a method argument.

16. The program product according to claim 8, wherein, wherein the call history information is passed to the another method as a method argument.

17. A just in time (JIT) compiler system according to claim 7, wherein the call history information is passed to the another method as a method argument.

18. The method according to claim 1, wherein the call history information is passed to the another method as a method argument.

* * * * *